United States Patent
Zhou et al.

(10) Patent No.: US 8,963,918 B2
(45) Date of Patent: Feb. 24, 2015

(54) RAY TRACING ON GRAPHICS HARDWARE USING KD-TREES

(75) Inventors: Kun Zhou, Beijing (CN); Hou Qiming, Beijing (CN); Baining Guo, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 594 days.

(21) Appl. No.: 12/241,044

(22) Filed: Sep. 30, 2008

(65) Prior Publication Data
US 2010/0079451 A1    Apr. 1, 2010

(51) Int. Cl.
G06T 15/00    (2011.01)
G06T 15/06    (2011.01)
G06T 17/00    (2006.01)

(52) U.S. Cl.
CPC .............. G06T 15/06 (2013.01); G06T 17/005 (2013.01)
USPC ........... 345/420; 345/419; 345/426; 345/427; 345/421

(58) Field of Classification Search
CPC ....................................... G06F 3/048
USPC ................... 345/420, 421, 426, 427, 419
See application file for complete search history.

(56) References Cited

U.S. PATENT DOCUMENTS

| | | |
|---|---|---|
| 5,313,568 A | 5/1994 | Wallace et al. |
| 6,597,359 B1 | 7/2003 | Lathrop |
| 7,012,604 B1 | 3/2006 | Christie et al. |
| 7,212,207 B2 | 5/2007 | Green et al. |
| 7,289,118 B2 | 10/2007 | Schmittler et al. |
| 7,289,119 B2 | 10/2007 | Heirich et al. |
| 7,773,088 B2 * | 8/2010 | Keller et al. ................... 345/426 |
| 7,852,336 B2 * | 12/2010 | Brown et al. .................. 345/427 |
| 7,864,174 B2 * | 1/2011 | Shearer ......................... 345/421 |
| 7,884,819 B2 * | 2/2011 | Kuesel et al. .................. 345/426 |
| 7,940,266 B2 * | 5/2011 | Shearer ......................... 345/426 |
| 8,390,618 B2 * | 3/2013 | Reshetov ....................... 345/420 |
| 2006/0066616 A1 | 3/2006 | Sevastianov et al. |
| 2007/0182732 A1 | 8/2007 | Woop et al. |
| 2008/0088622 A1 | 4/2008 | Shearer |

OTHER PUBLICATIONS

Singh et al, The Photon Pipeline Revisited: A Hardware Architecture to Accelerate Photon Mapping; Vision Computer, pp. 1-13, 2007.*
Horn et al, Interactive k-D Tree GPU Raytracing, Proceedings of the 2007 symposium on Interactive 3D graphics and games (2007), ACM Press, pp. 167-174.*
Choi et al, Parallel SAH k_D Tree Construction, High Performance Graphics, 2010, pp. 1-10.*
Popov et al, Experiences with Streaming Construction of SAH KD-Trees, 2006, pp. 1-6.*

(Continued)

*Primary Examiner* — Phu K Nguyen
(74) *Attorney, Agent, or Firm* — Dan Choi; Peter Taylor; Micky Minhas

(57) ABSTRACT

Described is a technology by which a ray tracer incorporates a GPU-based kd-tree builder for rendering arbitrary dynamic scenes. For each frame, the ray tracer builds a kd-tree for the scene geometry. The ray tracer spawns and traces eye rays, reflective and refractive rays, and shadow rays. For each ray to be traced, the ray tracer walks through the kd-tree until it reaches leaf nodes and associated triangles. When a ray passes through both sides of a splitting plane, the "far" sub-tree is pushed into the stack and the "near" sub-tree is traversed first.

20 Claims, 9 Drawing Sheets

(56) References Cited

OTHER PUBLICATIONS

Wald et al, Balancing Considered Harmful-Faster Photon Mapping using the Voxel Volume Heiristic, Eurographics 2004, pp. 1-9, 2004.*

Horn, et al., "Interactive k-D Tree GPU Raytracing", Proceedings of the 2007 symposium on Interactive 3D graphics and games, Session: Fast rendering, Year of Publication: 2007, pp. 167-174.

Fowler, et al., "Towards Real Time Ray Tracing on Modern Multi Core CPU Architectures", GV2 Group, School of Computer Science & Statistics, Trinity College Dublin, Retrieved on May 6, 2008, 1 Page.

Hunt, et al., "Fast kd-Tree Construction with an Adaptive Error-Bounded Heuristic", IEEE Symposium on Interactive Ray Tracing 2006, Publication Date: Sep. 2006, 31 Pages.

Shevtsov, et al., "Highly Parallel Fast KD-Tree Construction for Interactive Ray Tracing of Dynamic Scenes", Eurographics 2007, vol. 26 (2007), No. 3, pp. 395-404.

"Accelerated Ray Tracing Using a KD-Tree", Last Modified: Mar. 16, 2005, http://www.cs.helsinki.fi/u/vkarvone/2005k/ds-project/ray-tracing-kd-tree.html.

* cited by examiner

Node A

Split Plane

RAY TRACING ON GRAPHICS HARDWARE USING KD-TREES

CROSS-REFERENCE TO RELATED APPLICATIONS

The present application is related to copending U.S. patent application Ser. Nos. 12,241,046 and 12/241,045, hereby incorporated by reference.

BACKGROUND

A kd-tree (short for k-dimensional tree) is a well-known space-partitioning data structure for organizing points in k-dimensional space. As an acceleration structure, kd-trees have been used in a variety of graphics applications.

Because of its significant usage in graphics, fast kd-tree construction has been a subject of much interest in recent years, with several CPU-based algorithms proposed and/or implemented. With a kd-tree, for example, scenes can be rendered, including by ray tracing to generate images by tracing light through pixels in a plane. Ray tracing is useful in commercial modeling and rendering software, but is computationally slow and thus not dynamically used to render frequently changing scenes.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which a ray tracer uses a kd-tree built via graphics hardware to produce a frame of a dynamic scene. For each frame, the ray tracer builds a kd-tree for the scene geometry, in which building the kd-tree comprises differentiating large nodes from small nodes based on geometry primitives associated with each node, splitting large nodes into child nodes by empty space splitting and spatial splitting, and splitting small nodes into child nodes based on computed costs for split candidates.

The ray tracer spawns and traces eye rays, reflective and refractive rays, and shadow rays. For each ray to be traced, the ray tracer walks through the kd-tree until it reaches leaf nodes and associated triangles. When a ray passes through both sides of a splitting plane, the "far" sub-tree is pushed into the stack and the "near" sub-tree is traversed first Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards a mechanism comprising a GPU ray tracer for arbitrary dynamic scenes. For each frame, the ray tracer builds a kd-tree for the scene geometry from scratch. For each ray to be traced, the ray tracer walks through the kd-tree until it reaches leaf nodes and the associated triangles, in front to back order. The ray tracer that it can efficiently handle dynamic geometries that are directly evaluated on the GPU, such as subdivision surfaces and skinned meshes.

Some of the examples herein describe an implementation of a kd-tree builder based on NVIDIA Corporation's CUDA framework. CUDA provides a general-purpose C language interface for GPU programming, and also exposes hardware features which are useful for data-parallel computations. For example, it allows arbitrary gather and scatter memory access from GPU programs, as generally mentioned herein. For example, during kd-tree construction, some of the data is stored as dynamic lists in linear device memory allocated via CUDA; list size is doubled whenever more memory is required. This allows avoiding overhead in CUDA memory management after an initial run, at the cost of more memory consumption. For structures with many fields such as nodes and triangles, structure of arrays (SoA) instead of array of structures (AoS) are used for more optimal GPU cache performance. Further, parallel primitives such as reduce and scan are called in the example implementation, which are implemented.

Notwithstanding, it is understood that these are only examples, and the technology described herein may be implemented in other environments. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing and graphics processor computations in general.

Figure 1:
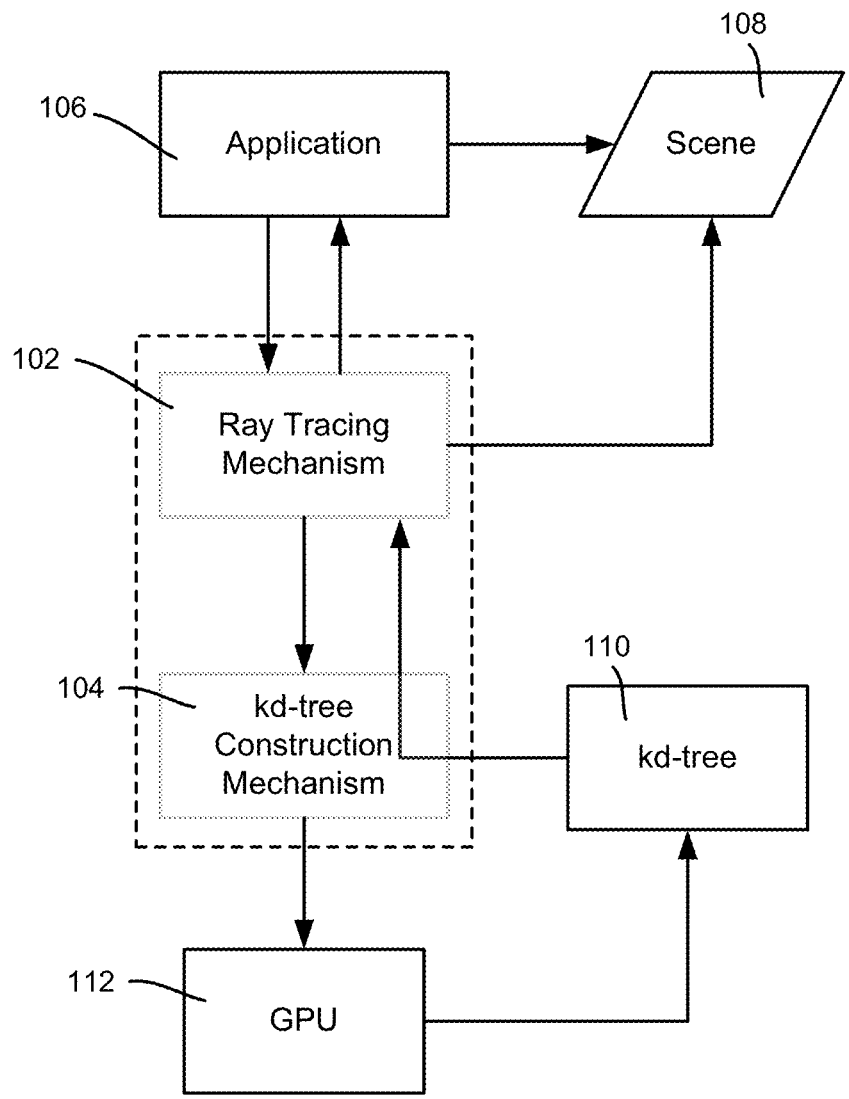
FIG. 1 is a block diagram representing example components of a kd-tree construction mechanism (builder) that builds kd-trees via graphics processing hardware.

Turning to FIG. 1, there is shown a general block diagram showing how a ray tracing mechanism 102 may work with an incorporated kd-tree construction mechanism 104, such as for use by an application 106 (which may be an operating system component) to dynamically render a scene 108. In general, the application 106 calls an API or the like (e.g., with supplied parameters) to work with the ray tracing mechanism 102, which uses the kd-tree construction mechanism to build a kd-tree 110 to represent photons. Alternatively, the ray tracing mechanism 102 may be incorporated into the application 106. The kd-tree construction mechanism 102 provides code and data for execution in the GPU 112, which executes the code to build the kd-tree 110.

In designing the kd-tree mechanism 104 (e.g., the algorithm set) for the GPU 112, the GPU's streaming architecture is leveraged when parallelizing kd-tree construction. Contemporary GPUs are substantially parallel, typically requiring over one-hundred threads for optimal performance. By following breadth-first search order, at each breadth-first search step, every node at the same tree level spawns a new thread and the total number of threads doubles from the preceding step.

To maintain kd-tree quality, schemes for fast evaluation of node split costs are provided, e.g., the efficient calculation of node split costs, such as the surface area heuristic (SAH) and voxel volume heuristic (VVH) costs are considered. The standard practice of precisely evaluating the costs for the tree nodes is prohibitively expensive for real-time techniques. To address this issue, different schemes for the so-called "large" and "small" nodes are described herein, wherein a node is deemed as large if the number of triangles in the node is greater than a user-specified threshold otherwise it is small (e.g., one such threshold for large/small node is set as T=64). As described below, for large nodes at upper tree levels, two heuristics are used to estimate the costs, namely median splitting and "empty space maximizing." For small nodes near the bottom of the tree, where exact evaluation of the costs is necessary, a data structure is provided for storing the geometry primitives in these nodes as bitmasks, which allows efficiently evaluation of the exact costs, as well as sorting these primitives using bitwise operations.

Figure 2:
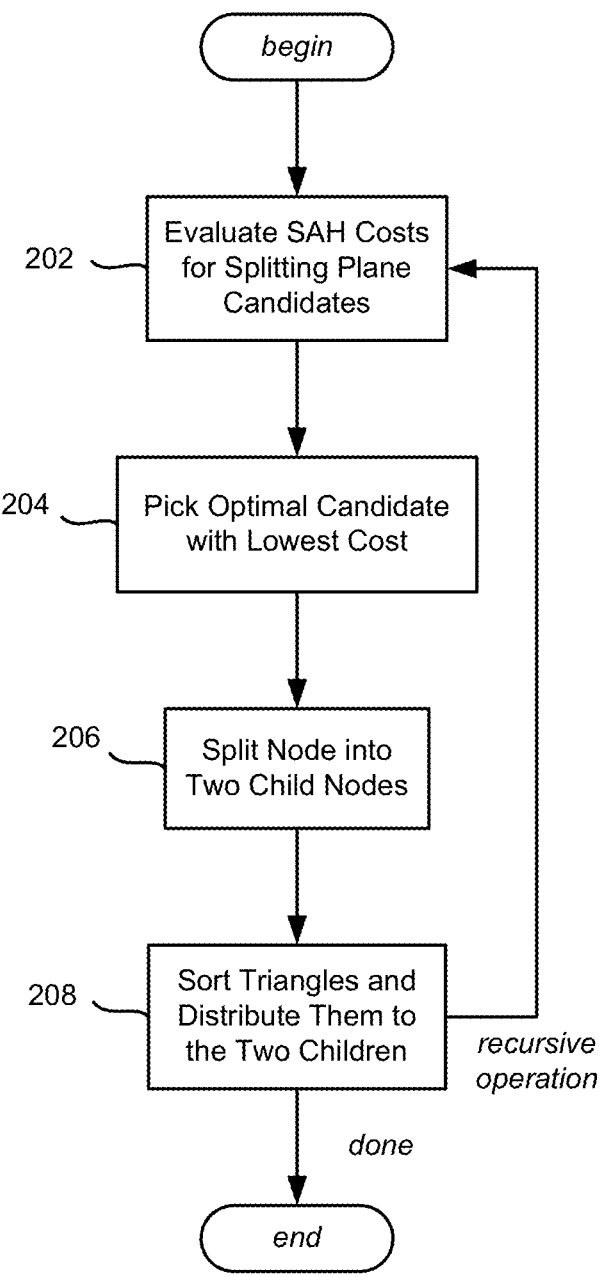
FIG. 2 is a flow diagram representing general steps of the kd-tree construction mechanism.

By way of one example of GPU-based kd-tree construction, an example of building SAH kd-trees, such as for ray tracing on the GPU, is described. The adaption of the algorithm to other kinds of kd-trees is straightforward. As with conventional kd-tree construction algorithms, the technique described herein builds a kd-tree in a greedy, top-down manner by recursively splitting the current node into two sub-nodes as in FIG. 2. Step 202 evaluates the SAH costs for splitting plane candidates, followed by step 204 which picks the optimal candidate with the lowest cost. The node is then split into two child nodes at step 206. Step 208 sorts triangles and distributes them to the two children.

The SAH cost function is defined as:

$$SAH(x) = C_{ts} + \frac{C_L(x)A_L(x)}{A} + \frac{C_R(x)A_R(x)}{A},$$

where $C_{ts}$ is the constant cost of traversing the node itself, $C_L(x)$ is the cost of the left child given a split position x, and $C_R(X)$ is the cost of the right child given the same split. $A_L(X)$ and $A_R(X)$ are the surface areas of the left and right child respectively, and A is the surface area of the node. Note that $C_L(x)$ and $C_R(x)$ can only be evaluated after the entire sub-tree has been built. Instead of seeking a globally optimal solution, existing algorithms use a locally greedy approximation by assuming the children are leaf nodes. In this case $C_L(x)$ and $C_R(x)$ equal the number of elements contained in the left and right child respectively.

Figure 3:
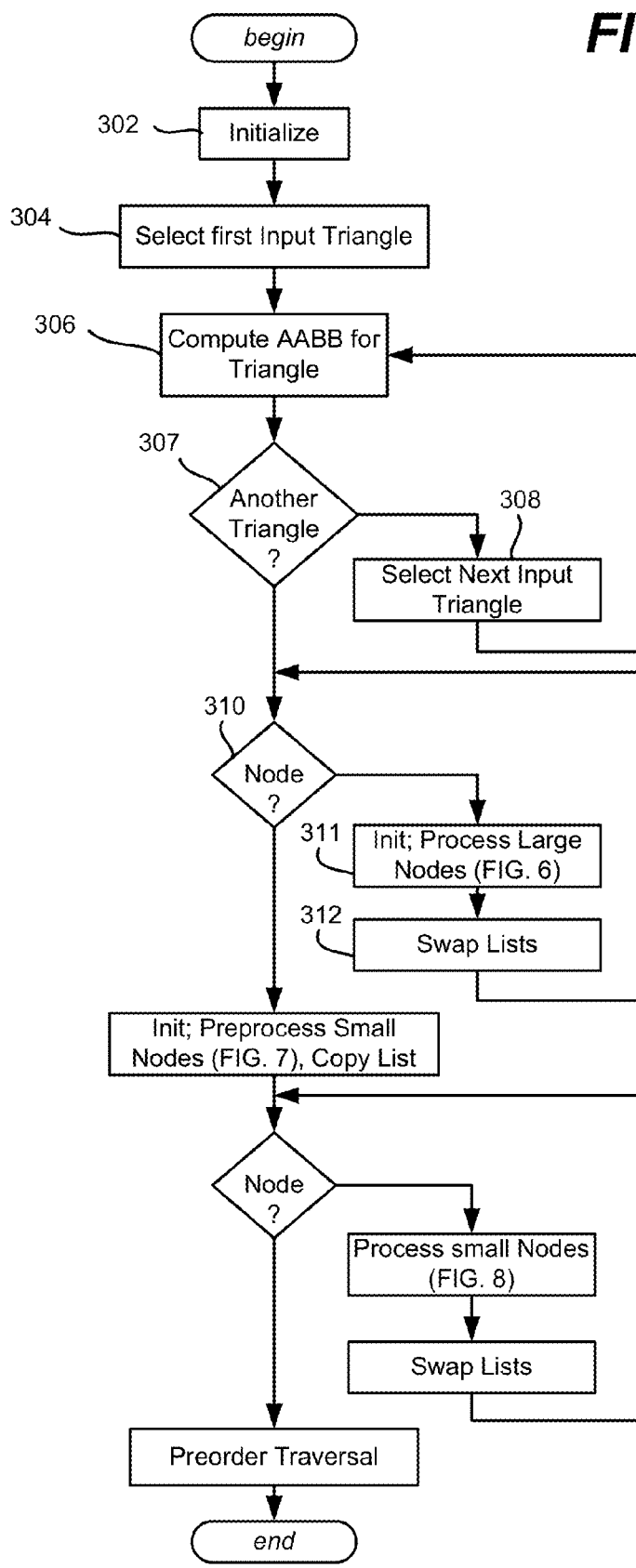
FIG. 3 is a flow diagram representing general steps of an algorithm for kd-tree construction.

The algorithm takes triangles as input and follows the construction pipeline as shown in FIG. 3 and set forth below:

Algorithm 1, Kd-Tree Construction:

```
// initialization stage
nodelist ← new list
activelist ← new list
smalllist ← new list
nextlist ← new list
Create rootnode
activelist.add(rootnode)
for each input triangle t in parallel
    Compute AABB for triangle t
// large node stage
while not activelist.empty( )
    nodelist.append(activelist)
    nextlist.clear( )
    PROCESSLARGENODES(activelist, smalllist, nextlist)
    Swap nextlist and activelist
// small node stage
PREPROCESSSMALLNODES(smalllist)
activelist ← smalllist
while not activelist.empty( )
    nodelist.append(activelist)
    nextlist.clear( )
    PROCESSSMALLNODES(activelist, nextlist)
    Swap nextlist and activelist
// kd-tree output stage
PREORDERTRAVERSAL(nodelist)
```

After an initialization step (step 302), the algorithm builds the tree in a breadth-first search manner, for both large nodes and small nodes. Then, the nodes of the tree are reorganized and stored. The pipeline comprises a set of stream processing steps together with some coordination work. The streaming steps are done on the GPU, while coordination work is done on the CPU (at relatively negligible costs).

In the initialization stage (step 302), global memories are allocated for tree construction and the root node is created. Additionally, at step 306 streaming step is performed to compute the axis-aligned bounding box (AABB) for each input triangle (in parallel, via steps 304, 307 and 308). In one current implementation, the user-specified threshold for large/small node is set as T=64.

Figure 4:
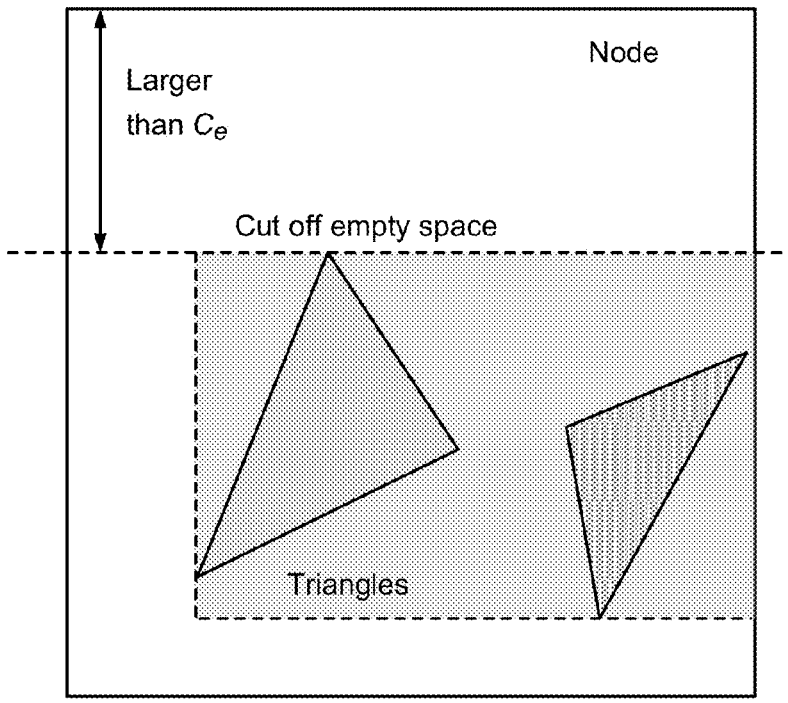
FIGS. 4 and 5 are example representations of splitting a large node, including by cutting off empty space (FIG. 4) and by a spatial median split (FIG. 5).
Figure 5:
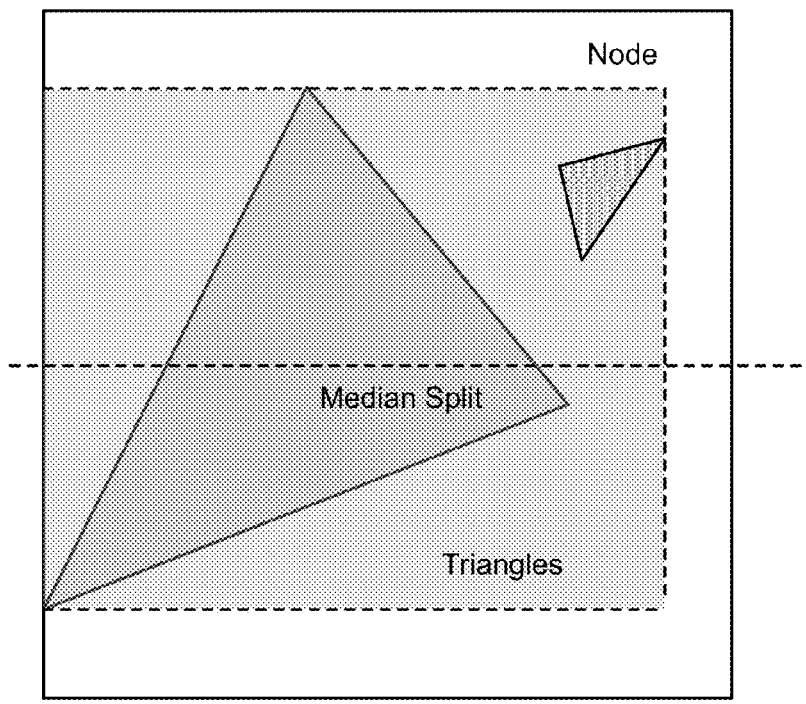

As mentioned above, the SAH evaluation in a conventional greedy optimization algorithm assumes that the current split produces two leaf nodes. For large nodes, this assumption is almost always untrue, whereby the resulting estimation is far from accurate. The splitting scheme described herein for large nodes is a combination of spatial median splitting and "empty space maximizing," which is effective for the upper levels of the tree. More particularly, if the empty space contained in the current node is larger than a predefined ratio $C_e$ along one axis, the empty space is cut off in the next split, as generally represented in FIG. 4; otherwise, the split plane is chosen at the spatial median of the node's longest axis split, as generally represented in FIG. 5. One current implementation takes $C_e$ equal to twenty five percent. Note that to apply this splitting scheme, a tight bounding box of the triangles contained in the node is computed.

Described herein is a strategy for large nodes at upper tree levels so as to further leverage the large scale parallelism of GPUs. For these nodes, the mechanism parallelizes the computation over geometric primitives instead of nodes at each level. This strategy is effective because there are only a relatively small number of large nodes at the upper levels, especially near the top of the tree, (which makes parallelizing over nodes inefficient and leaves the massive parallelism of GPUs underexploited). Moreover, the workload among threads is likely to be unbalanced because the number of primitives may vary significantly from node to node.

Figure 6:
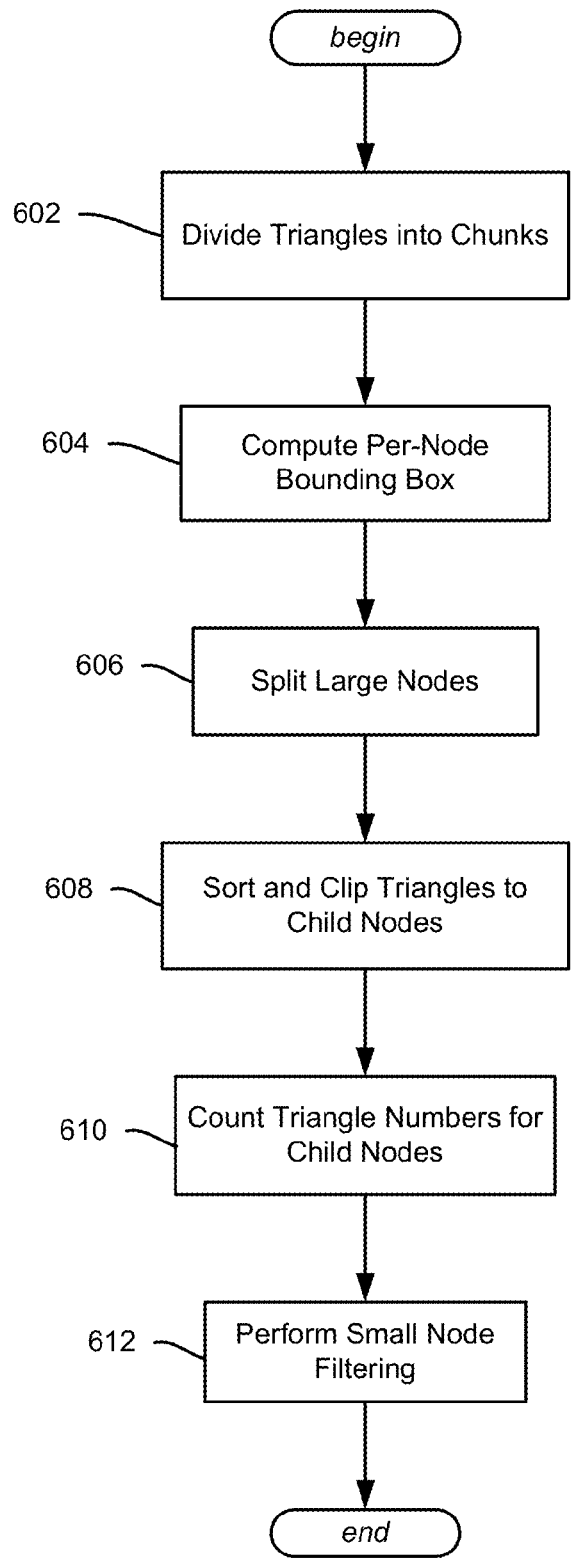
FIG. 6 is a flow diagram representing general steps of an algorithm for large node processing.

One suitable large node processing procedure, PROCESSLARGENODES, is set forth in Algorithm 2 and is also generally represented in FIG. 6:

Algorithm 2, Large Node Stage—PROCESSLARGENODES:

```
procedure PROCESSLARGENODES(
    in activelist:list;
    out smalllist.nextlist:list)
begin
    // divide triangles into chunks
    for each node i in activelist in parallel
        Divide all triangles in node i into fixed size chunks, store
        chunks in chunklist
    // compute per-node bounding box
    for each chunk k in chunklist in parallel
        Compute the bounding box of all triangles in k, using standard
        reduction
    Perform segmented reduction on per-chunk reduction result to
    compute per-node bounding box
    // split large nodes
    for each node i in activelist in parallel
        for each side j of node i
            if i contains more than $C_e$ empty space on
            side j then
                Cut off i's empty space on side j
        Split node i at spatial median of the longest axis
        for each created child node ch
            nextlist.add(ch)
    // sort and clip triangles to child nodes
    for each chunk k in chunklist in parallel
        i ← k.node( )
        for each triangle t in k in parallel
            if t is contained in both children of i then
                $t_0$ ← t
                $t_1$ ← t
                Sort $t_0$ and $t_1$ into two child nodes
                Clip $t_0$ and $t_1$ to their respective owner node
            else
                Sort t into the child node containing it
    // count triangle numbers for child nodes
    for each chunk k in chunklist in parallel
        i ← k.node( )
        Count triangle numbers in i's children, using reduction
    Perform segmented reduction on per-chunk result to compute
    per-child-node triangle number
    // small node filtering
    for each node ch in nextlist in parallel
        if ch is small node then
            smalllist.add(ch)
            nextlist.delete(ch)
end
```

This procedure takes activelist as input, and updates smalllist and nextlist as output. Note that a triangle-node association list is also maintained for each node list. The triangle-node association list stores triangle indices contained in the node list, sorted by node index. Each node in the node list records the index of its first triangle in the triangle-node association list and the triangle number it contains, the scene space it occupies, and the pointers to its child nodes.

FIG. 6 describes the general steps of the above algorithm. A first step (step 602) of the procedure divides the triangles in each node into fixed-sized chunks. In one implementation, the chunk size is set to N=256. A large fraction of the subsequent computations are parallelized over the triangles in these chunks.

In a second step (step 604), the bounding box of the triangles in each node is computed. This is done by first computing the bounding box of the triangle's AABBs in each chunk using a reduction algorithm (described below with respect to Algorithm 3), and then computing the bounding boxes of the nodes by performing segmented reduction in a known manner on the sequence of the chunk reduction results. Segmented reduction performs reduction on arbitrary segments of an input sequence. The result is a sequence in which each element holds the reduction result of one segment.

One suitable GPU algorithm for GPU segmented reduction is described in Algorithm 3:

```
procedure GPUSEGREDUCE(
    in data, owner:list; op: reduction operator;
    out result:list)
begin
    result ← new list
    Fill result with op's identity element
    // assume there are n elements
    for d = 0 to $\log_2 n - 1$
        for each i = 0 to $(n - 1)/2^{d+1}$ in parallel
            $w_0$ ← owner[$2^{d+1}i$]
            $w_1$ ← owner[$2^{d+1}i + 2^d$]
            if $w_0 \neq w_1$ then
                result[$w_1$] ← op(result[$w_1$], data[$2^{d+1}i + 2^d$])
            else
                data[$2^{d+1}i$] ← op(data[$2^{d+1}i$], data[$2^{d+1}i + 2^d$])
end
```

In the input list data, the data elements belonging to the same segment are located contiguously. In another input list owner, owner[i] indicates the segment index of data[i]. The reduction operator op is associated with an identity value, as listed in the table below:

| Operator | Identity value | Usage |
| --- | --- | --- |
| min | $+\infty$ | compute bounding box |
| max | $-\infty$ | compute bounding box |
| + | 0 | count triangle number |

The algorithm takes a multi-pass approach. Each thread takes two elements. If the two elements have the same owner, they are replaced by their operation result. Otherwise, one element is accumulated into result and the other is retained. Note that the chunk data structure is related to optimal performance. Within each chunk, only unsegmented reduction is performed on the triangles' axis-aligned bounding boxes, significantly reducing the element number in the subsequent segmented reduction. Although it is possible to compute the node bounding boxes by performing segmented reduction on the input triangles' axis-aligned bounding boxes directly, this is inefficient because large segmented reductions are about three times slower than large unsegmented reductions.

In a third step, (step 606), with computed node bounding boxes, large nodes are split in parallel using the splitting scheme described above. Note that a node is repeatedly split using empty space splitting until a spatial median split is reached. This allows reusing the bounding box and avoiding unnecessary computations after empty space splitting.

In a fourth step, (step 608), triangles are sorted and clipped into child nodes. Triangle sorting is essentially list splitting. For each chunk, the triangles in the chunk are first checked to generate a vector of Boolean values, which indicates whether each triangle is in a child node or not. Then the triangles are divided into two groups, with the triangles marked true on the left side of the output vector and the triangles marked false on the right side. This can be easily done using a known split operation. For those triangles contained in both child nodes, another pass is needed to clip them into the nodes. In another step, step 610, the triangle numbers for the child nodes are counted using segmented reduction in a way similar to bounding box computation. The reduction operator used here is "+". To filter small nodes, if the triangle number of a node is less than the threshold T, it is added to smalllist and deleted from nextlist, as generally represented by step 612.

Compared to the large node stage, the small node stage is relatively simple. First, the computation is parallelized over nodes rather than triangles. The workload among small nodes is naturally balanced because the triangle numbers of small nodes do not vary significantly (from 0 to T). Second, unlike in the large node stage, triangles are not clipped when splitting small nodes. Although clipping triangles to owner nodes reduces false positives of the triangle-in-node test and reduces the SAH cost, clipping may also cause undesirable excessive splits because SAH does not take memory costs into account. While clipping is effective for large nodes by preventing false positives from accumulating over future splits, for small nodes, actual experiments indicate that clipping rarely improves ray tracing performance. Thus triangles are not clipped for small nodes, and the splitting plane candidates are restricted to those determined by the faces of the axis-aligned bounding boxes of triangles contained in the initial small nodes.

Figure 7:
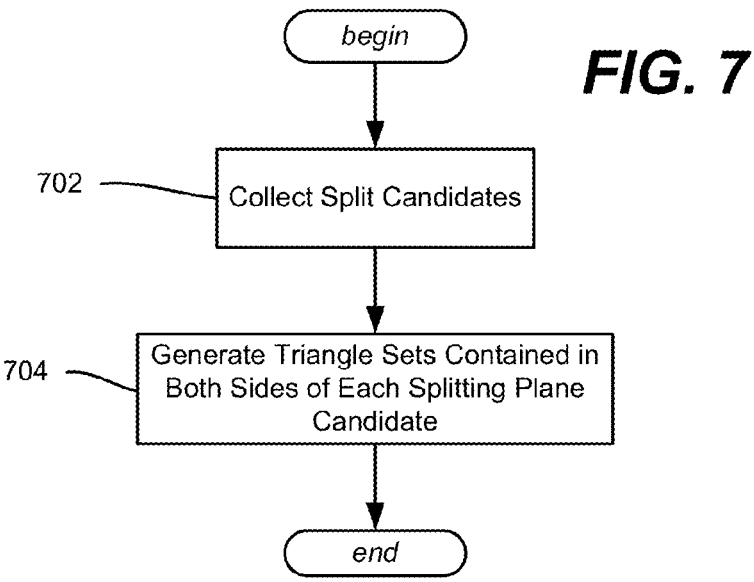
FIG. 7 is a flow diagram representing general steps of an algorithm for small node preprocessing.
Figure 8:
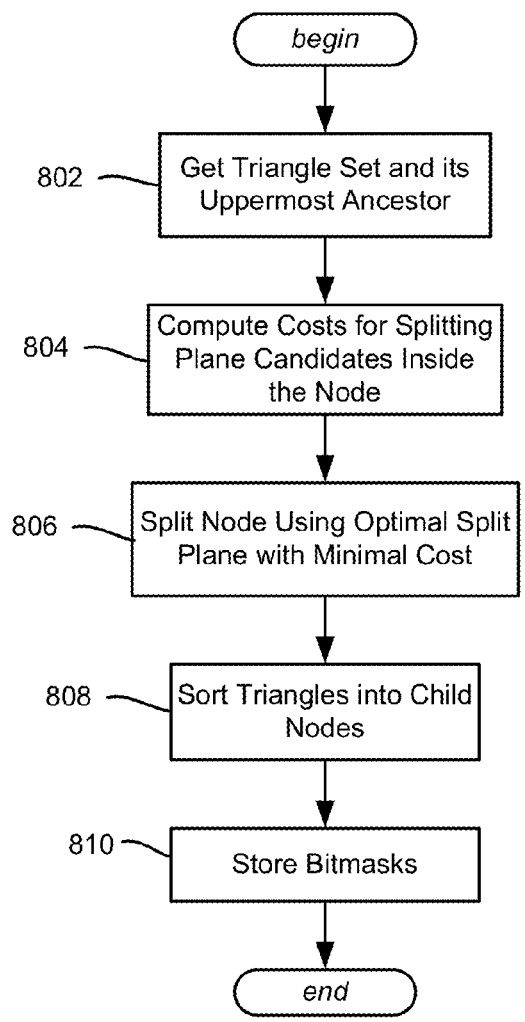
FIG. 8 is a flow diagram representing general steps of an algorithm for small node processing.

As shown in Algorithm 4 and as generally represented in FIGS. 7 and 8, the small node stage comprises two procedures, PREPROCESSSMALLNODES (FIG. 7) and PROCESSSMALLNODES (FIG. 8):

```
procedure PREPROCESSSMALLNODES(smalllist:list;)
begin
    for each node i in smalllist in parallel
        i.split List ← list of all split candidates in i
        for each split candidate j in i in parallel
            /* "left" represents smaller coordinate */
            j.left ← triangle set on the left of j
            j.right ← triangle set on the right of j
end
procedure PROCESSSMALLNODES(
    in activelist:list;
    out nextlist:list)
begin
    for each node i in activelist in parallel
        // compute SAH and determine the split plane
        s ← i.triangleSet
        r ← i.smallRoot
        A₀ ← area of node i
        SAH₀ ← || s ||
        for j where j ∈ r.splitList and j.triangle ∈ s
            C_L ← || s ∩ j.left ||
            C_R ← || s ∩ j.right ||
            A_L ← area of left child after split j
            A_R ← area of right child after split j
            SAH_j ← (C_L A_L + C_R A_R)/A₀ + C_ts
        p ← The split candidate that yields minimal SAH
        // split small nodes
        if SAH_p ≥ SAH₀ then
            Mark i as leaf node
        else
            Split i using p. add new nodes to nextlist
            Sort triangles to new nodes
end
```

The first procedure collects the split candidates, as generally represented at step 702 of FIG. 7. As generally represented at step 704, the preprocessing also generates the triangle sets contained in both sides of each splitting plane candidate with a single pass over the triangles in a node.

Figure 9:
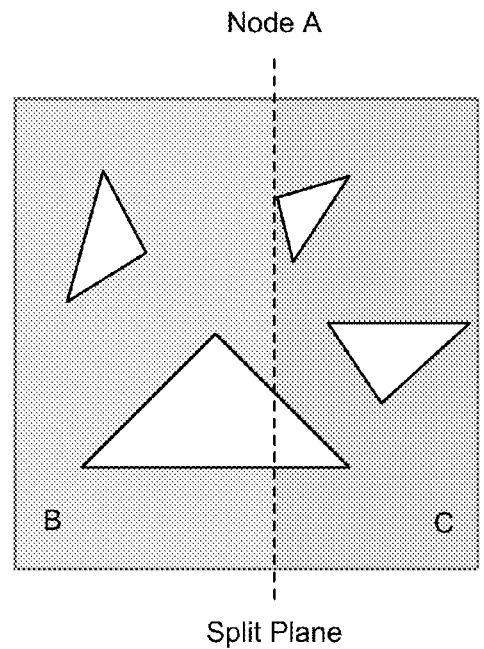
FIGS. 9 and 10 are example representations of storing triangle sets as bitmasks for a small root, including splitting a node (FIG. 9) into subsets of triangles for storing as bitmasks (FIG. 10).
Figure 10:
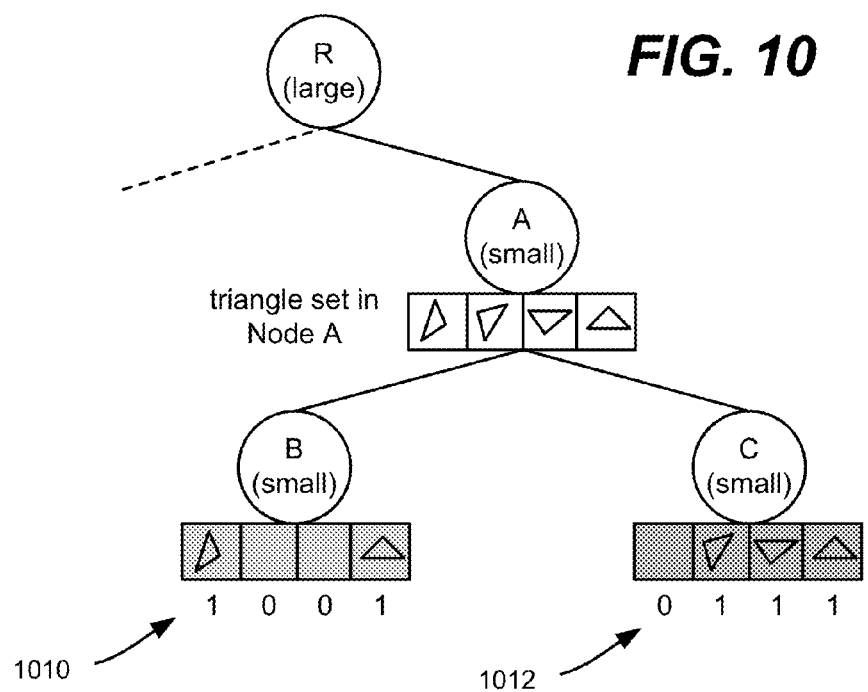

As generally represented in FIG. 8, the second procedure, PROCESSSMALLNODES, splits small nodes. Processed in parallel for each node i, the procedure (at step 802) gets its triangle set, triangleSet, and its uppermost ancestor, smallRoot, (also a small node) in the tree. Then the SAH costs for the splitting plane candidates located inside the node are computed (step 804). At step 806 the node is split using the optimal split plane with minimal cost, and triangles are sorted into child nodes (step 808). Instead of storing the triangle sets in the triangle-node association lists as is done in the large node stage, the triangle sets are stored in small nodes as a bitmask of its smallRoot, (step 810) as shown in FIGS. 9 and 10. Note that the triangle sets of each split candidate j, j.left and j.right, are also stored as bitmasks (e.g., 1010 and 1012). With this bitmask representation, triangle sorting and SAH evaluation for any split candidate can be efficiently done using bitwise operations.

As shown in Algorithm 4, the bitmask of the left child is computed as the bitwise AND of the bit mask of the current node s and the bit mask of the left side of the split candidate j, which is pre-computed in PREPROCESSSMALLNODES. Then a known parallel bit counting routine is performed on the resulting bit mask to get the triangle number of the left child. The bit mask representation allows computing the optimal split plane in O(n) time and sort triangles in O(1) time. An alternative method for computing the optimal splitting plane in O(n) is to sort the split candidates in a preprocess. Then the cost functions of the split candidates and the optimal splitting plane can be computed by only a single pass over the sorted data, at the cost of O(n). However, since the sorted order cannot be represented as a bit mask, triangle sorting can only be done at the cost of O(n).

Figure 11:
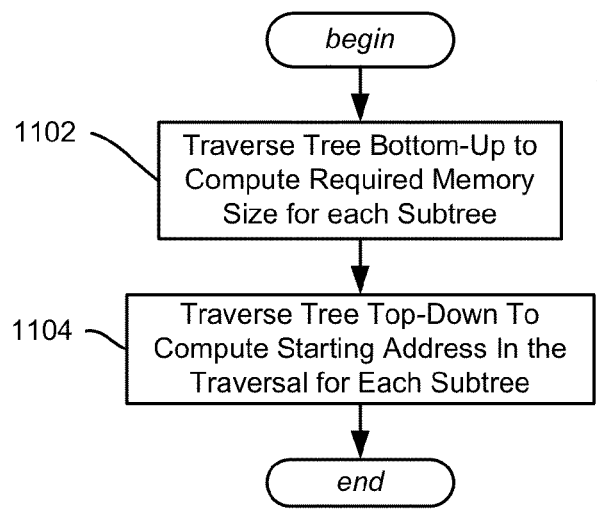
FIG. 11 is a flow diagram representing general steps of a preorder traversal algorithm.

As described in the aforementioned related patent application, one implemented GPU ray tracer is stack-based, requiring the kd-tree's final layout to be a preorder traversal of nodes for optimal cache performance. The preorder traversal is computed using two parallel breadth-first search traversals, e.g., as set forth in Algorithm 5 (PREORDERTRAVERSAL) and as represented in FIG. 11:

```
procedure PREORDERTRAVERSAL(nodelist:list)
begin
    for each tree level l of nodelist from bottom-up
        UPPASS(l)
    Allocate tree using root node's size
    for each tree level l of nodelist from top-down
        DOWNPASS(l)
end
procedure UPPASS(activelist:list)
begin
    for each node i in activelist in parallel
        if i is not a leaf then
            i.size ← i.left.size + i.right.size + 1
        else
            i.size ← i.triangleCount + 1
end
procedure DOWNPASS(activelist:list)
begin
    for each node i in activelist in parallel
        if i is not a leaf then
            i.left.address ← i.address + 1
            i.right.address ← i.address + 1 + i.left.size
        Store node i in final format to i.address
end
```

A first pass (step 1102) traverses the tree bottom-up to compute required memory size for each sub-tree. A second pass (step 1104) traverses the tree top-down to compute the starting address in the traversal for each sub-tree, and distributes node information to the corresponding address to produce the final tree. Note that the PREORDERTRAVERSAL algorithm collects nodes located at the same tree level. Further note that this information is already available in each while-loop in Algorithm 1.

After preorder traversal, each node in the resulting node list records the number and indices of the triangles it contains, its splitting plane, and the links to its children.

In one implementation, the kd-tree building mechanism 104 (FIG. 1) is incorporated into a GPU-based ray tracing mechanism 102 for use in rendering arbitrary dynamic scenes. For each frame, the ray tracing mechanism 102 builds a kd-tree 110 from scratch. Then, for each ray to be traced, the ray tracing mechanism 102 walks through the kd-tree 110 until it reaches leaf nodes and the associated triangles, in front to back order. Note that while existing GPU ray tracers adopt a stackless scheme for kd-tree traversal, they require additional information to be pre-computed and stored during tree construction, and extra computation during tree traversal.

To avoid such overhead, a conventional stack-based scheme is implemented on the GPU. When a ray passes through both sides of a splitting plane, the "far" sub-tree is pushed into the stack and the "near" sub-tree is traversed first. For this reason a stack-based scheme requires a local stack for each thread. Note that this can be efficiently implemented in CUDA, for example, by allocating a fixed-sized array in thread-local memory. Although kd-tree depth is unbounded in theory, a stack depth of fifty is generally sufficient.

Figure 12:
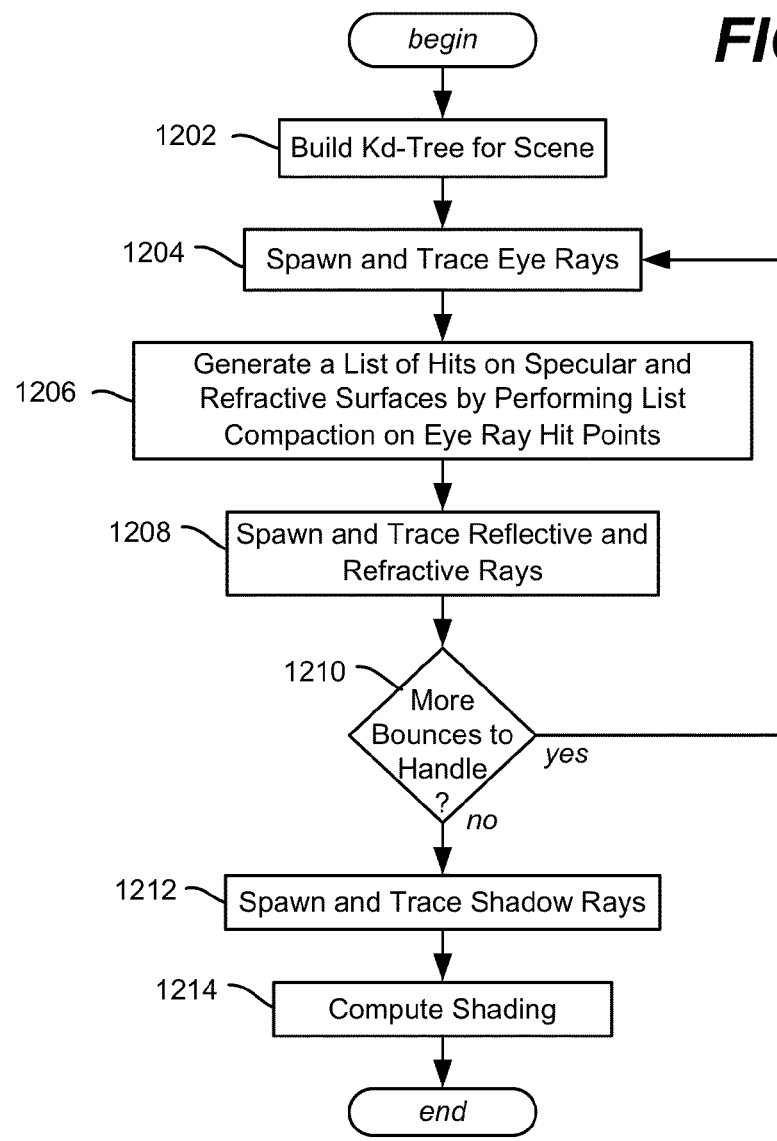
FIG. 12 is a flow diagram representing general steps for use in ray tracing for rendering arbitrary dynamic scenes.

As generally represented in FIG. 12, in order to handle reflection/refraction, the ray tracing mechanism 102 performs multiple passes after building a kd-tree for the scene (step 1202). As represented by step 1204, the ray tracing mechanism spawns and traces eye rays. At step 1206, the ray tracing mechanism generates a list of hits on specular and refractive surfaces by performing a list compaction on eye ray hit points. At step 1208, the ray tracing mechanism then spawns and traces reflective and refractive rays.

If there are more ray bounces to handle, as evaluated by step 1210, the process loops back to step 1204. When no bounces remain, step 1212 spawns and traces shadow rays, and step 1214 computes shading.

After the shading is computed, each ray's contribution to the final image is sent to an OpenGL pixel buffer object (PBO). The PBO is then accumulated to the final image using alpha blending.

The ray tracer can efficiently handle dynamic geometries that are directly evaluated on the GPU, such as skinned meshes and subdivision surfaces. The input geometry is a sequence of coarse control meshes; two levels of Loop subdivision and displacement mapping are performed on the GPU to generate the detailed meshes. The output of GPU subdivision and displacement mapping is immediately sent to the GPU kd-tree builder and then ray traced directly, without copying back to the CPU.

Exemplary Operating Environment

Figure 13:
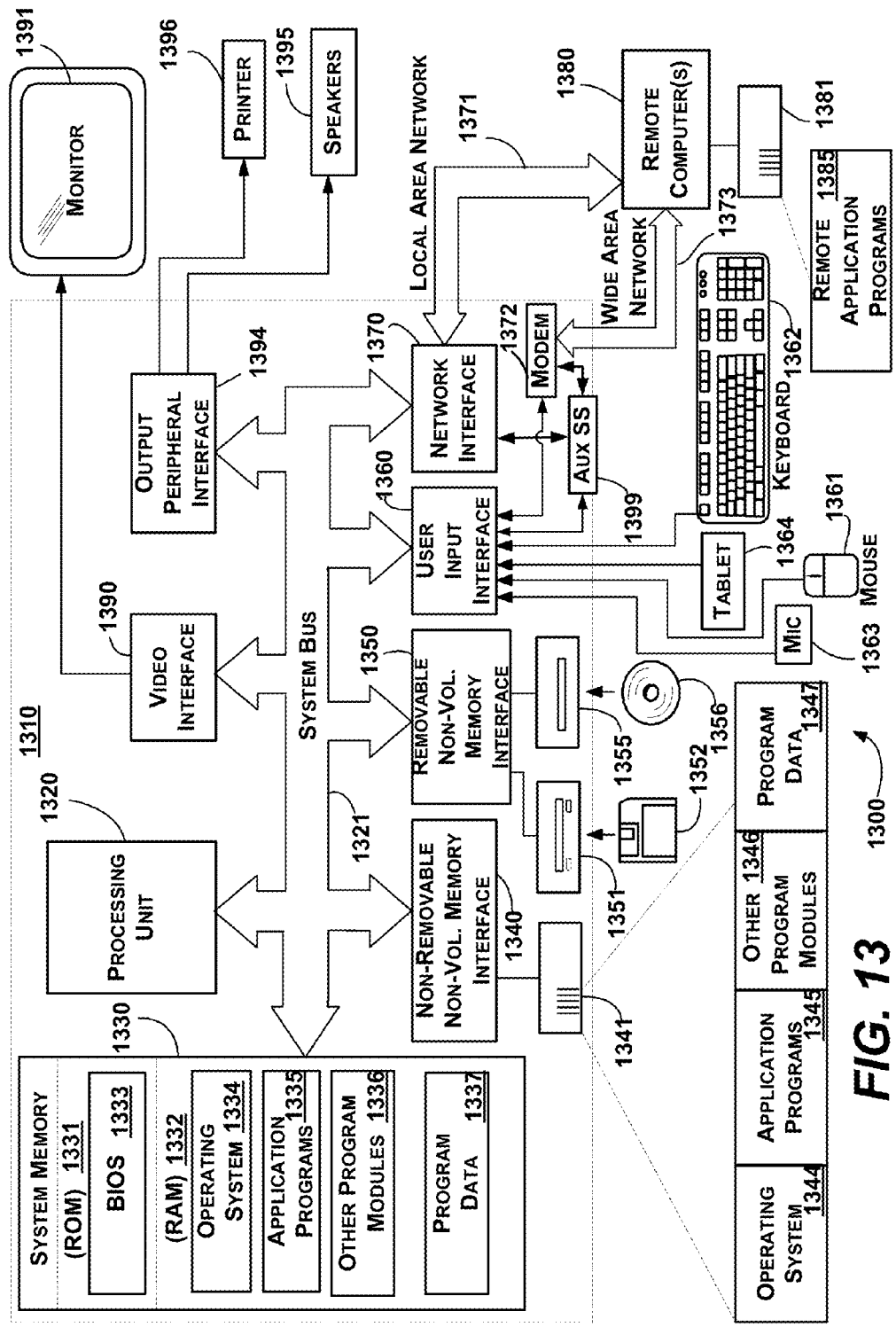
FIG. 13 shows an illustrative example of a computing environment into which various aspects of the present invention may be incorporated.

FIG. 13 illustrates an example of a suitable computing and networking environment 1300 on which the examples of FIGS. 1-12 may be implemented. The computing system environment 1300 is only one example of a suitable computing environment and is not intended to suggest any limitation as to the scope of use or functionality of the invention. Neither should the computing environment 1300 be interpreted as having any dependency or requirement relating to any one or combination of components illustrated in the exemplary operating environment 1300.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 13, an exemplary system for implementing various aspects of the invention may include a general purpose computing device in the form of a computer 1310. Components of the computer 1310 may include, but are not limited to, a processing unit 1320, a system memory 1330, and a system bus 1321 that couples various system components including the system memory to the processing unit 1320. The system bus 1321 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1310 typically includes a variety of computer-readable media. Computer-readable media can be any available media that can be accessed by the computer 1310 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 1310. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above may also be included within the scope of computer-readable media.

The system memory 1330 includes computer storage media in the form of volatile and/or nonvolatile memory such as read only memory (ROM) 1331 and random access memory (RAM) 1332. A basic input/output system 1333 (BIOS), containing the basic routines that help to transfer information between elements within computer 1310, such as during start-up, is typically stored in ROM 1331. RAM 1332 typically contains data and/or program modules that are immediately accessible to and/or presently being operated on by processing unit 1320. By way of example, and not limitation, FIG. 13 illustrates operating system 1334, application programs 1335, other program modules 1336 and program data 1337.

The computer 1310 may also include other removable/non-removable, volatile/nonvolatile computer storage media. By way of example only, FIG. 13 illustrates a hard disk drive 1341 that reads from or writes to non-removable, nonvolatile magnetic media, a magnetic disk drive 1351 that reads from or writes to a removable, nonvolatile magnetic disk 1352, and an optical disk drive 1355 that reads from or writes to a removable, nonvolatile optical disk 1356 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1341 is typically connected to the system bus 1321 through a non-removable memory interface such as interface 1340, and magnetic disk drive 1351 and optical disk drive 1355 are typically connected to the system bus 1321 by a removable memory interface, such as interface 1350.

The drives and their associated computer storage media, described above and illustrated in FIG. 13, provide storage of computer-readable instructions, data structures, program modules and other data for the computer 1310. In FIG. 13, for example, hard disk drive 1341 is illustrated as storing operating system 1344, application programs 1345, other program modules 1346 and program data 1347. Note that these components can either be the same as or different from operating system 1334, application programs 1335, other program modules 1336, and program data 1337. Operating system 1344, application programs 1345, other program modules 1346, and program data 1347 are given different numbers herein to illustrate that, at a minimum, they are different copies. A user may enter commands and information into the computer 1310 through input devices such as a tablet, or electronic digitizer, 1364, a microphone 1363, a keyboard 1362 and pointing device 1361, commonly referred to as mouse, trackball or touch pad. Other input devices not shown in FIG. 13 may include a joystick, game pad, satellite dish, scanner, or the like. These and other input devices are often connected to the processing unit 1320 through a user input interface 1360 that is coupled to the system bus, but may be connected by other interface and bus structures, such as a parallel port, game port or a universal serial bus (USB). A monitor 1391 or other type of display device is also connected to the system bus 1321 via an interface, such as a video interface 1390. The monitor 1391 may also be integrated with a touch-screen panel or the like. Note that the monitor and/or touch screen panel can be physically coupled to a housing in which the computing device 1310 is incorporated, such as in a tablet-type personal computer. In addition, computers such as the computing device 1310 may also include other peripheral output devices such as speakers 1395 and printer 1396, which may be connected through an output peripheral interface 1394 or the like.

The computer 1310 may operate in a networked environment using logical connections to one or more remote computers, such as a remote computer 1380. The remote computer 1380 may be a personal computer, a server, a router, a network PC, a peer device or other common network node, and typically includes many of the of the elements described above relative to the computer 1310, although only a memory storage device 1381 has been illustrated in FIG. 13. The logical connections depicted in FIG. 13 include one or more local area networks (LAN) 1371 and one or more wide area networks (WAN) 1373, but may also include other networks. Such networking environments are commonplace in offices, enterprise-wide computer networks, intranets and the Internet.

When used in a LAN networking environment, the computer 1310 is connected to the LAN 1371 through a network interface or adapter 1370. When used in a WAN networking environment, the computer 1310 typically includes a modem 1372 or other means for establishing communications over the WAN 1373, such as the Internet. The modem 1372, which may be internal or external, may be connected to the system bus 1321 via the user input interface 1360 or other appropriate mechanism. A wireless networking component 1374 such as comprising an interface and antenna may be coupled through a suitable device such as an access point or peer computer to a WAN or LAN. In a networked environment, program modules depicted relative to the computer 1310, or portions thereof, may be stored in the remote memory storage device. By way of example, and not limitation, FIG. 13 illustrates remote application programs 1385 as residing on memory device 1381. It may be appreciated that the network connections shown are exemplary and other means of establishing a communications link between the computers may be used.

An auxiliary subsystem 1399 (e.g., for auxiliary display of content) may be connected via the user interface 1360 to allow data such as program content, system status and event notifications to be provided to the user, even if the main portions of the computer system are in a low power state. The auxiliary subsystem 1399 may be connected to the modem 1372 and/or network interface 1370 to allow communication between these systems while the main processing unit 1320 is in a low power state.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover the modifications, alternative constructions, and equivalents falling within the spirit and scope of the invention.

What is claimed is:

1. In a computing environment, a method comprising, building a kd-tree representative of scene geometry via graphics processing unit (GPU)-based parallel processing, wherein small nodes and large nodes of the kd-tree are built in breadth-first search order and into a layout comprising a preorder traversal of nodes of the kd-tree, and using the layout of the kd-tree for ray tracing to produce a frame of a dynamic scene, including for at least one ray that passes through both sides of a splitting plane of a node, traversing a sub-tree corresponding to a near side of the splitting plane and pushing a sub-tree corresponding to a far side of the splitting plane into a stack for later traversal.

2. The method of claim 1 further comprising, building a new kd-tree for a subsequent frame.

3. The method of claim 1 wherein building the kd-tree comprises, differentiating large nodes from the small nodes based on geometry primitives associated with each node, splitting the large nodes into child nodes by empty space splitting and spatial splitting, and splitting the small nodes into child nodes based on computed costs for split candidates.

4. The method of claim 1 wherein the layout comprises information for each node in the kd-tree, the information comprising a splitting plane and links to children nodes.

5. The method of claim 1 further comprising storing data corresponding to the preorder traversal into a cache.

6. The method of claim 1 further comprising spawning eye rays, and tracing the eye rays including by storing data in the kd-tree.

7. The method of claim 6 wherein using the kd-tree for ray tracing comprises, processing the kd-tree to determine where the eye rays hit specular and refractive surfaces.

8. The method of claim 1 further comprising spawning reflective and refractive rays, and tracing the reflective and refractive rays including by storing data in the kd-tree.

9. The method of claim 5 further comprising spawning and tracing shadow rays.

10. In a computing environment having at least one graphics processing unit (GPU), a system comprising, a kd-tree building mechanism coupled to the at least one GPU, and a ray tracing mechanism coupled to the kd-tree building mechanism to build in breadth-first search order a kd-tree representative of scene geometry, to store information corresponding to at least a portion of a preorder traversal of the kd-tree, to traverse the kd-tree to determine ray-related data to produce a frame of a dynamic scene, and if a ray passes through both sides of a splitting plane, the ray tracing mechanism is configured to use the information to traverse a sub-tree corresponding to a near side of the splitting plane and push a sub-tree corresponding to a far side of the splitting plane into a stack for later traversal.

11. The system of claim 10 wherein the ray tracing mechanism and kd-tree building mechanism build a new kd-tree for a subsequent frame.

12. The system of claim 10 wherein the ray tracing mechanism traverses the kd-tree to determine whether the ray passes through both sides of the splitting plane, and wherein the stack is a local stack for a thread.

13. The system of claim 10 wherein the ray tracing mechanism traces eye rays including by storing data in the kd-tree, and processes the kd-tree tree to determine where the eye rays hit specular and refractive surfaces.

14. The system of claim 10 wherein the ray tracing mechanism traces reflective and refractive rays including by storing data in the kd-tree.

15. The system of claim 10 wherein the ray tracing mechanism traces shadow rays including by storing data in the kd-tree.

16. The system of claim 10 further comprising, using the ray tracing mechanism to handle dynamic geometries.

17. One or more computer-readable storage media having computer-executable instructions, which when executed perform steps, comprising:
（a) building nodes of a kd-tree in breadth-first search order representing scene geometry via at least some parallel operations executed on a graphics processing unit (GPU), including computing node information comprising a required memory and a starting address for each sub-tree in a preorder traversal of the kd-tree and allocating a space in memory for nodes of the each sub-tree based upon the node information;
(b) spawning and tracing eye rays, including for each ray to be traced, walking through the kd-tree to reach leaf nodes and associated triangles using the node information;
(c) determining where the eye rays hit specular and refractive surfaces;
(d) spawning and tracing reflective and refractive rays;
(e) determining whether additional ray bounces are to be handled, and if so, returning to step (b); and
(f) outputting data corresponding to the rays for rendering a scene, including handling dynamic geometries associated with direct evaluation on the GPU.

18. The one or more computer-readable storage media of claim 17 having further computer-executable instructions, which in response to execution by the computer, cause the computer to perform steps further comprising, repeating steps (a) through (f) for each frame of a dynamic scene.

19. The one or more computer-readable storage media of claim 17 having further computer-executable instructions, which in response to execution by the computer, cause the computer to perform steps further comprising, when a ray passes through both sides of a splitting plane, a sub-tree corresponding to a far side of the splitting plane is pushed into the stack and a sub-tree corresponding to a near side of the splitting plane is traversed first.

20. The one or more computer-readable storage media of claim 17 having further computer-executable instructions, which in response to execution by the computer, cause the computer to perform steps further comprising, performing at least one of computing shading or spawning and tracing shadow rays.

* * * * *